Patented July 13, 1943

2,324,012

UNITED STATES PATENT OFFICE 2,324,012

EXTRACTION OF ORGANIC MATERIALS

Joseph Edward Mitchell, East Rutherford, N. J., assignor to Colgate-Palmolive-Peet Company, Jersey City, N. J., a corporation of Delaware No Drawing. Application May 10, 1940, Serial No. 334,362

9 Claims. (Cl. 260—397.2)

The present invention is directed to the recovery of vitamins, sterols and other unsaturated alcoholic or related compounds from organic materials, and more particularly it relates to the separation of phytosterols from tall oil.

In general, the present invention comprises the extraction of alkaline compositions containing vitamins, alcohols and/or sterols and the organic materials normally associated therewith, with a solvent containing liquid sulphur dioxide. The liquid sulphur dioxide dissolves the sterols without dissolving any substantial amount of the alkali modified material associated therewith. By evaporation of the liquid sulphur dioxide, the sterols may be recovered usually as a solid, light colored crystalline material insoluble in hot or cold caustic solution.

The material to be treated for recovery of sterols is saponified with alkali, if it has not already been so treated. The neutralized material, preferably in a dry state, is then extracted with a solvent comprising liquid sulphur dioxide. Liquid sulphur dioxide alone is very effective for this purpose but it is possible to employ it in admixture with a miscible solvent such as benzene, toluene, ethylene, isobutylene, halogenated and polyhalogenated hydrocarbons such as perchlorethylene carbon tetrachloride, chlorbenzene, allyl chloride, ethyl alcohol, acetone, ether or other aromatic, alkylated aromatic, olefinic or halogenated compounds for extracting monovalent alkaline compositions.

Another variation in the purification is to use calcium, magnesium or other polyvalent metal bases or carbonates in treating the sterol containing compositions. These saponified compositions can then be dissolved in a suitable solvent such as benzine, naphtha, gasoline, benzene or the like to separate any insoluble material therefrom such as sugars and cellulose directly or by aqueous extraction. The solvent is then removed and the solute extracted with liquid sulphur dioxide. Alternatively, while in dry solution in a saturated aliphatic hydrocarbon solvent, it may be extracted with the liquid sulphur dioxide, preferably by a continuous countercurrent extraction in a suitable tower.

The saponified compositions may be used in a relatively impure state or they may be given preliminary purification treatments. A particularly desirable step of pretreatment is to extract a hot aqueous or suitable solution of the saponified mixture with a concentrated caustic alkaline brine solution, preferably while agitating with steam, in order to extract the caustic brine soluble compounds such as phenols, mercaptans, glycerine and lignin-like materials. In this manner, it is possible to obtain purer products. The purified material may then be dried and extracted with the liquid sulphur dioxide to recover the unsaponifiable material therefrom.

The process is particularly suitable for recovering relatively pure sterols from tall oil soap. The tall oil sodium soap may be separated from the black liquor; and the soap is then washed with a concentrated solution of sodium chloride containing free caustic soda to free it from lignin-like and phenolic bodies. The purified soap is then dried, for example by passing over heated rolls, spraying in a heated atmosphere, or in an oven. The soap is powdered and admixed with liquid sulphur dioxide with vigorous agitation. The liquid sulphur dioxide is then filtered to separate the insoluble soap.

The liquid sulphur dioxide is evaporated to recover the sterol bodies extracted from the soap. The soap may be given a plurality of treatments with the solvent to facilitate complete recovery of the sterols. The sterols may be taken up in the same or different solvents to recrystallize them as relatively pure compounds.

The following examples are given for the purpose of illustrating the principles of the present invention but are not intended to be limiting on the scope thereof.

Example I

Crude sulphate soap (tall oil soap) freshly separated from the black liquor of sulphate pulp processing is dried over steel rolls heated by steam at 50 lbs. per square inch. The resulting dry soap is powdered. About 25 grams of the powdered soap is thoroughly mixed with 300 c. c. liquid sulphur dioxide at a temperature of about —10° C. The mixture is then filtered to remove the insoluble soap from the liquid sulphur dioxide solution of the sterol bodies. The sulphur dioxide is evaporated from the filtrate which is then blown with carbon dioxide gas. The yield is about 1.5 grams (6%) of a crystalline solid insoluble in dilute caustic soda solution. The odor and physical properties of the purified soap are improved.

Although the above example is directed to the treatment of tall oil soap, it is also possible to similarly treat other sterol, vitamin and/or hormone containing materials by the saponification of tallow, animal grease, olive oil, palm oil, peanut oil, corn oil, rosin, coconut oil, tung oil, linseed oil, soy bean oil, oiticica oil, wool fat, compressed yeast, fish oils such as tunny oil, ray oil, walrus oil, dolphin oil, porpoise oil, sardine oil, cod oil, shark oil, whale oil, sperm oil and the corresponding liver oils, spermaceti, butter, Japan wax, beeswax, or the fatty acids thereof.

*Example II*

250 grams of compressed yeast (68% water) are admixed with 60 grams of potassium hydroxide in 300 c. c. of 80% alcohol and the mixture is refluxed for about four hours. The hot solution at about 75° C. is filtered to remove insoluble material. The solution is then evaporated to dryness. The dried products are extracted with twelve times their weight of liquid sulphur dioxide to separate the unsaponifiable sterol bodies therefrom. The sulphur dioxide is vaporized from the extract. The extract is taken up in hot alcohol and the sterols are fractionally crystallized therefrom.

*Example III*

300 parts by weight of soy bean oil are heated for about three hours with 300 parts by weight of 20° Bé. aqueous caustic soda solution in a soap pan with open and closed steam. The hot soap solution is mixed with a concentrated sodium chloride brine containing 5% of caustic soda. After boiling the mixture with steam for about one hour, the mixture is permitted to settle. The lower alkaline brine containing glycerine and other caustic brine soluble constituents are separated from the soap containing sterols. The caustic brine washing step is repeated and the brines are combined for recovering glycerine and other bodies therefrom. The remaining soap is then dried on a steam heated roll. The dried soap is extracted with about ten times its weight of liquid sulphur dioxide. The sulphur dioxide is evaporated from the extract to recover the sterol bodies. These sterols may be taken up in hot alcohol, acetone or ethyl acetate and may be recrystallized therefrom.

The method of producing the soap may be by any standard procedure. Various alkaline materials may be employed including caustic soda, caustic potash, soda ash, potash, lime, magnesia, or the like. It is also possible to prepare a water soluble soap solution and precipitate an insoluble soap therefrom by the addition of a polyvalent metal salt such as calcium chloride or the like. The soap may be treated directly or in admixture with organic or inorganic addition materials such as calcium sulphate, sodium chloride or solvents.

As many widely different embodiments of the invention may be made without departing from the spirit and scope thereof, it is to be understood that the application is not limited to the specific proportions or embodiments thereof except as defined in the following claims.

I claim:

1. A process of separating sterols from organic materials which comprises extracting a substantially anhydrous mixture containing a fatty acid soap and a sterol with a solvent comprising liquid sulphur dioxide.

2. A process of separating sterols from organic materials which comprises extracting a substantially anhydrous organic solvent solution containing a fatty acid soap of a polyvalent metal and a sterol with an immiscible solvent comprising liquid sulphur dioxide.

3. A process of separating sterols from organic materials which comprises treating a naturally-occurring fatty acid material with a hot caustic solution, filtering, drying the filtrate, and extracting the substantially anhydrous saponified material with a solvent comprising liquid sulphur dioxide.

4. A process of separating sterols from organic materials which comprises washing a crude tall oil soap with a hot caustic alkaline brine, drying the brine extracted soap, and extracting the dry soap with a solvent comprising liquid sulphur dioxide as the major constituent.

5. A process of separating sterols from organic materials which comprises extracting a substantially anhydrous alkali-saponified fish oil with a solvent comprising liquid sulphur dioxide.

6. A process of separating sterols from organic materials which comprises extracting a substantially anhydrous tall oil soap mixture containing sterols with a solvent comprising liquid sulphur dioxide.

7. A process of separating sterols from organic materials which comprises extracting a substantially anhydrous alkali-saponified yeast with a solvent comprising liquid sulphur dioxide.

8. A process of separating sterols from organic materials which comprises extracting a substantially anhydrous carboxylic acid soap containing a sterol with a solvent comprising liquid sulphur dioxide.

9. The process which comprises saponifying compressed yeast with hot alcoholic caustic solution, filtering the hot soap solution, evaporating the solvent from said solution, and extracting the dried material with a solvent comprising liquid sulphur dioxide.

JOSEPH EDWARD MITCHELL.